United States Patent
Yamaboshi et al.

(10) Patent No.: US 6,849,590 B1
(45) Date of Patent: Feb. 1, 2005

(54) PROCESS FOR PRODUCING GRANULES FOR SUPPORTING SURFACTANT

(75) Inventors: Hiroki Yamaboshi, Wakayama (JP); Shuji Takana, Wakayama (JP); Teruo Kubota, Wakayama (JP); Hitoshi Takaya, Wakayama (JP); Hiroyuki Yamashita, Wakayama (JP); Hideichi Nitta, Wakayama (JP)

(73) Assignee: KAO Corporation, Tokyo (JP)

( * ) Notice: Subject to any disclaimer, the term of this patent is extended or adjusted under 35 U.S.C. 154(b) by 0 days.

(21) Appl. No.: 09/869,359

(22) PCT Filed: Dec. 28, 1999

(86) PCT No.: PCT/JP99/07374
§ 371 (c)(1),
(2), (4) Date: Jun. 28, 2001

(87) PCT Pub. No.: WO00/39265
PCT Pub. Date: Jul. 6, 2000

(30) Foreign Application Priority Data

Dec. 28, 1998 (JP) .......................... 10-373114

(51) Int. Cl.$^7$ .............................. C11D 11/00
(52) U.S. Cl. ............ 510/441; 510/442; 510/443; 510/444; 510/452; 510/438
(58) Field of Search ................. 510/441, 442, 510/443, 444, 452, 438

(56) References Cited

U.S. PATENT DOCUMENTS

| | | | | |
|---|---|---|---|---|
| 3,929,679 A | * | 12/1975 | Cala ........................... | 510/349 |
| 4,239,640 A | * | 12/1980 | Williams et al. ............. | 510/442 |
| 4,414,130 A | * | 11/1983 | Cheng ......................... | 510/532 |
| 4,547,352 A | | 10/1985 | Ertle .......................... | 423/239 |
| 4,707,290 A | * | 11/1987 | Seiter et al. ................. | 510/443 |
| 4,992,607 A | | 2/1991 | Harandi et al. ............. | 585/467 |
| 5,024,778 A | * | 6/1991 | Grecsek ...................... | 510/349 |
| 5,139,693 A | * | 8/1992 | Wilms et al. ............... | 510/438 |
| 5,591,707 A | | 1/1997 | Raehse et al. .............. | 510/451 |
| 6,284,722 B1 | * | 9/2001 | Yamaguchi et al. ........ | 510/357 |
| 6,376,453 B1 | | 4/2002 | Kubota et al. .............. | 510/438 |

FOREIGN PATENT DOCUMENTS

| | | |
|---|---|---|
| EP | A-2221776 | 5/1987 |
| GB | 983243 | * 2/1965 |
| GB | 989683 | * 4/1965 |
| GB | A-2095274 | 9/1982 |
| GB | A-2097419 | 11/1982 |
| JP | 61-138697 A | 6/1986 |
| JP | 63099296 A | * 4/1988 |
| JP | A63275699 | 11/1988 |
| JP | 3-504732 A | 10/1991 |
| WO | A1-9205849 | 4/1992 |

* cited by examiner

*Primary Examiner*—Lorna M. Douyon
(74) *Attorney, Agent, or Firm*—Birch, Stewart, Kolasch & Birch, LLP

(57) ABSTRACT

The present invention relates to a process for preparing particles for supporting a surfactant, comprising a step of giving a defect to a coating film containing a water-soluble component, wherein the coating film is formed on surfaces of raw material particles; and a process for preparing detergent particles comprising a step of mixing a surfactant composition and the particles for supporting a surfactant obtained by the above process, under conditions that the surfactant composition shows a liquid state. By using the process of the present invention, there can be obtained particles for supporting a surfactant, in which the supporting ability of the particles is improved, without lowering the detergency. In addition, by using the particles for supporting a surfactant, there can be obtained detergent particles having excellent detergency.

11 Claims, 2 Drawing Sheets

(a)

(b)

PROCESS FOR PRODUCING GRANULES FOR SUPPORTING SURFACTANT

This application is the national phase under 35 U.S.C. § 371 of PCT International Application No. PCT/JP99/07374 which has an International filing date of Dec. 28, 1999, which designated the United States of America and was not published in English.

TECHNICAL FIELD

The present invention relates to a process for preparing particles for supporting a surfactant used for the preparation of detergent particles by adding a liquid surfactant thereto. Further, the present invention relates to a process for preparing detergent particles using the particles for supporting a surfactant.

BACKGROUND ART

As the surfactant usable for detergents, those in a liquid form are well used. For instance, a nonionic surfactant having excellent detergency performance against sebum dirt stains is in a liquid state or pasty state at an ordinary temperature. In addition, much of anionic surfactants are solid, and they are often used in the form of aqueous solutions from the viewpoint of easiness in handling.

As a process of using the liquid surfactant described above in a powder detergent, a composition containing the surfactant may be supported in the particles. As the particles for uses described above, those having a large absorption amount (supporting ability) of the surfactant are preferable, from the viewpoint of suppressing the bleed-out of the surfactant. In a case where the surfactant cannot be sufficiently supported in the particles, an oil-absorbing carrier having a high supporting ability or the like is usually used for the purpose of maintaining the properties as the powder detergent. However, the oil-absorbing carrier does not contribute much to the detergency performance. Therefore, reduction in the amount used is demanded, from the viewpoint of the quality of the powder detergent.

The techniques purposed for improvement in the supporting ability include those techniques disclosed in Japanese Patent Laid-Open No's. Sho 57-159898 and Sho 62-112697. In these techniques, however, since a substance unnecessary for the detergency performance is formulated and a compositional limitation is necessitated, for achieving the above-mentioned objects, there is a concern for lowered detergency in exchange for the improvement in the supporting ability.

One of the particles formulated with the detergent composition is spray-dried particles obtained by spray-drying a slurry containing water-soluble components such as a water-soluble salt and a water-soluble polymer. When the spray-dried particles are used as particles supporting a surfactant, since the particles have a structure such that the surface is coated by a film containing the water-soluble component from its production process, it has been difficult to increase its supporting ability.

DISCLOSURE OF INVENTION

Accordingly, an object of the present invention is to provide a process for preparing particles for supporting a surfactant having an improved supporting ability without lowering the detergency. Further, another object of the present invention is to provide a process for preparing detergent particles having excellent detergency by using the particles.

These objects and other objects of the present invention will be apparent from the following description.

Specifically, the present invention relates to:

[1] a process for preparing particles for supporting a surfactant, comprising a step of giving a defect to a coating film containing a water-soluble component, wherein the coating film is formed on surfaces of raw material particles; and

[2] a process for preparing detergent particles comprising a step of mixing a surfactant composition and the particles for supporting a surfactant obtained by the process according to the invention under conditions that the surfactant composition shows a liquid state.

BEST MODE FOR CARRYING OUT THE INVENTION

1. Composition of Raw Material Particles

Figure 1:
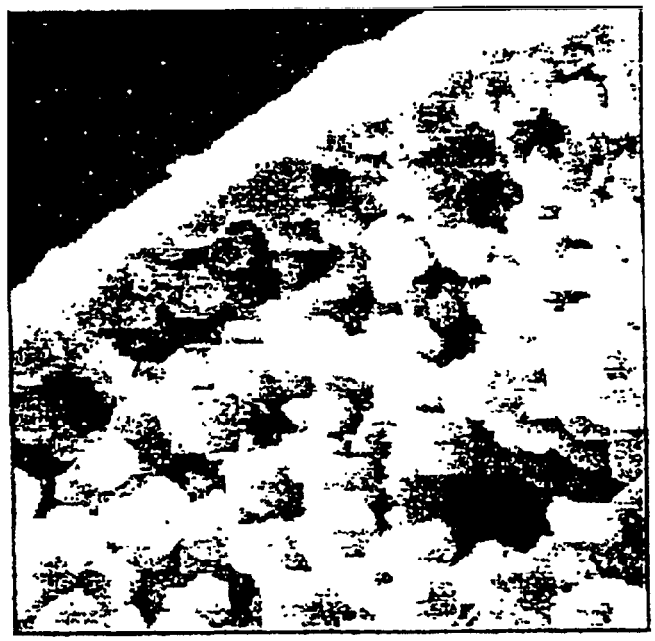
FIG. 1 is an SEM view of the raw material particles, wherein (a) shows its split cross section, and (b) shows a surface thereof.
Figure 1:
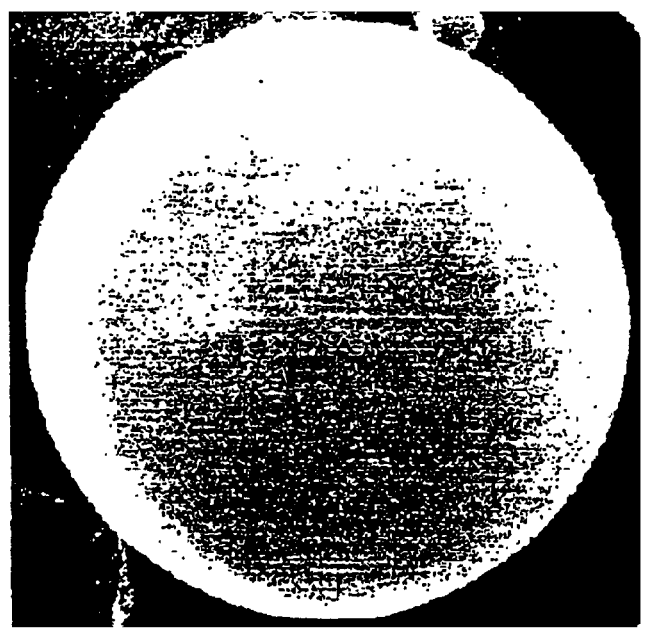

The water-soluble components which are preferably formulated in the raw material particles mainly comprise a water-soluble polymer (A) and a water-soluble salt (B). In the particles, either one of the component (A) or the component (B) may be contained, or both the component (A) and the component (B) may be contained. Since both of the water-soluble components contribute to the improvement in the detergency, the raw material particles containing the components are more preferable.

Among the water-soluble components, the component (A) includes carboxylic acid-based polymers, carboxymethyl cellulose, soluble starches, sugars, and the like, among which the carboxylic acid-based polymers are preferable, from the viewpoint of the detergency. The water-soluble polymers may be used in combination of two or more kinds. It is preferable that the carboxylic acid-based polymers are acrylic acid homopolymers, acrylic acid-maleic acid copolymers, each having a molecular weight of from 2000 to 100000, or salts thereof, for the purposes of the action of dispersing the solid particle stains from clothes in a washing tub, and preventing re-deposition of the particles to the clothes, besides having the function of capturing metal ions.

The component (B) includes water-soluble inorganic salts represented by alkali metal salts, ammonium salts, or amine salts each having a carbonate group, a hydrogencarbonate group, a sulfate group, a sulfite group, a hydrogensulfate group, a chloride group, a phosphate group; and water-soluble organic salts having a low molecular weight such as citrates and fumarates. The water-soluble salts may be used in combination of two or more kinds. Among the above-mentioned alkali metal salts, sodium carbonate is a base material, which is preferable as an alkalizing agent for showing a suitable pH buffering region in a washing liquid. Those salts having a high degree of dissociation such as sodium sulfate, potassium sulfate, and sodium sulfite enhance an ionic strength of a washing liquid, and favorably act on detergency against sebum stains and the like. The use of sodium tripolyphosphates does not hinder the effects of the present invention.

As described above, either of the component (A) and the component (B) has a preferable property as the detergent component In order to further improve the supporting ability of the particles for supporting a surfactant, it is preferable that the raw material particles further comprise a water-insoluble inorganic substance (C). The water-insoluble inorganic substance of the component (C) is preferably those having an average primary particle size of from 0.1 to 20 μm. The water-insoluble inorganic substance is, for instance, aluminosilicates, silicon dioxides, hydrated silicate compounds, clay compounds such as perlite and bentonite, and the like. Aluminosilicates, silicon dioxides, and hydrated silicate compounds are preferable, among which the crystalline aluminosilicates are preferable, because they act as the metal ion capturing agent in the detergent composition.

Therefore, as the raw material particles, those comprising a water-soluble polymer (A), a water-soluble salt (B) and a water-insoluble inorganic substance (C) are preferable, from the viewpoints of the detergency and the supporting ability.

In order to improve the supporting ability of the particles for supporting a surfactant obtained by giving a defect in a coating film containing the water-soluble components, wherein the coating film is formed on the particle surface in the present invention, it is effective to use a base material having a large supporting ability as the water-insoluble inorganic substance, and zeolite can be preferably used. Among them, A-type zeolite is more preferable, from the viewpoints of the metal ion capturing ability and the costs. Also, amorphous silicas and amorphous aluminosilicates having a high supporting ability but a low metal ion capturing ability can be used as the water-insoluble inorganic compound.

In the present invention, these water-insoluble inorganic substances may be used in combination of several kinds.

The composition of the raw material particles is as follows. The content of the water-soluble polymer of the component (A) is preferably from 2 to 30% by weight, more preferably from 3 to 20% by weight, most preferably from 5 to 20% by weight, of the raw material particles. The content of the water-soluble salt of the component (B) is preferably from 5 to 78% by weight, more preferably from 10 to 70% by weight, most preferably from 20 to 60% by weight, of the raw material particles. The content of the water-insoluble inorganic substance of the component (C) is preferably from 20 to 90% by weight, more preferably from 30 to 75% by weight, most preferably from 40 to 70% by weight, of the raw material particles. Within this range, it is preferable from the viewpoint of satisfying both the supporting ability and the particle strength of the resulting particles for supporting a surfactant.

In the raw material particles, there may be contained auxiliary components such as fluorescent dyes, pigments and dyes, which are favorable in the final detergent composition, in addition to the three components (A) to (C). The content of the auxiliary component is preferably 5% by weight or less, more preferably 2% by weight or less, of the raw material particles.

It is most preferable that the surfactant is not substantially contained in the raw material particles, from the viewpoint of the supporting ability. When the surfactant is formulated, its content is preferably 5% by weight or less, more preferably 2% by weight or less, of the raw material particles. Here, the content of these auxiliary components and surfactant are values calculated on the basis of the solid content of the slurry.

When the content of the surfactant in the raw material particles is too high, there are some disadvantages that 1) the raw material particle has a structure in which a coating film containing a surfactant is formed on the surface thereof, so that an effect of improving the supporting ability is not sufficiently exhibited even if an aqueous medium were added; and 2) the strength of the raw material particle tends to be lowered, so that the particle is likely to be disintegrated in the process of giving a defect to the coating film. Therefore, even when a "spray-dried material" containing a relatively large amount of a surfactant as disclosed in, for instance, Japanese Unexamined Publication No. Hei 9-502220 is used as the raw material particles, it would be difficult to obtain particles having an excellent supporting ability of the surfactant as described in the present invention.

2. Properties of Raw Material Particles

The preferred average particle size of the raw material particles is from 150 to 500 μm, more preferably from 180 to 300 μm. Within this range, it is preferable from the viewpoint of obtaining detergent particles having excellent dissolubility.

The preferred bulk density of the raw material particles is from 400 to 1000 g/L, more preferably from 500 to 800 g/L. Within this range, it is preferable from the viewpoint of obtaining detergent particles having a bulk density of 500 g/L or more.

The water content of the raw material particles is preferably from 1 to 8% by weight, more preferably from 1 to 5% by weight. Within this range, it is preferable from the viewpoint of having good handleability of the raw material particles.

3. Embodiment of Raw Material Particles

The raw material particles for supporting a surfactant are particles in which a coating film containing a water-soluble component is formed on surfaces of the raw material particles. The embodiment of the raw material particles having a coating film includes, for instance, dry particles obtained by spray-drying a slurry containing a water-soluble component, and the like.

4. Embodiment of Aqueous Medium

The aqueous medium which is contacted with the raw material particles (hereinafter simply referred to as "particles") is those which comprise water. Concretely, the aqueous medium may be water, or it may be an aqueous solution of an inorganic salt within a range so as not to hinder its effects. By the contact with the aqueous medium, the supporting ability of the particles is improved. This is presumably due to the fact that the coating film containing a water-soluble component which is formed on the surface of the raw material particles dissolves by the contact with the aqueous medium, thereby exposing a porous structure on the particle surface. In order to further improve the supporting ability of the particles, an aqueous medium in which the organic substance is dissolved is preferable. When the organic substance is added in a small amount to the aqueous medium, the surface tension of the aqueous medium is lowered, so that the particle surface is likely to be wetted, thereby making the surface easily porous. A majority of the organic substance has an action of lowering its surface tension when dissolved in water, and it is preferable that the organic substance is a surfactant, from the viewpoint of the detergent composition.

A process for contacting an aqueous medium with particles is preferably a process in which an aqueous medium is uniformly contacted with particles. It is preferable to add (spray) an aqueous medium in the form of fine granules with a spray nozzle or the like, because the surface can be more uniformly made porous. The droplet diameter of the aqueous medium during this process is preferably 500 μm or less, more preferably 100 μm or less.

The higher the temperature of the aqueous medium to be contacted with the particles, the larger the improvement in the supporting ability, and the most preferable embodiment is steam. Since the coating film containing the water-soluble component which covers the particle becomes more easily dissolvable by using a high-temperature steam, the porosity can be facilitated. By using steam as the aqueous medium, an improvement in the supporting ability can be achieved with a smaller amount thereof as compared to a case where water at an ordinary temperature is used, and at the same time an effect of improving the supporting ability is also remarkable. When the amount of the aqueous medium added to the particles is exceedingly too large, the aqueous medium per se fills the supporting space of the particle, so that the supporting ability only improves in a limited sense in some cases. In such cases, drying must be carried out in the subsequent steps. On the other hand, when steam is used, a sufficient effect can be obtained with a small amount of steam added, so that drying is not required in the subsequent steps. The temperature when steam is used is preferably 105° C. or more, more preferably 110° C. or more.

The amount of the aqueous medium to be contacted with the particles, as water in the aqueous medium, is preferably from 0.1 to 10 parts by weight, more preferably from 0.5 to 5 parts by weight, especially preferably from 1 to 3 parts by weight, based on 100 parts by weight of the particles, from the viewpoint of exhibiting a given effect and from the viewpoint of preventing re-coating of an open hole by the dissolved water-soluble component for the coating film.

5. Process for Preparing Particles for Supporting Surfactant

The process of the present invention comprises a step of giving a defect to a coating film containing a water-soluble component, wherein the coating film is formed on surfaces of raw material particles. One embodiment there,of includes, for instance, the embodiment comprising the following step (a) and step (b). The embodiment may further comprise step (c) after step (as occasion demands.

Step (a): drying a slurry, thereby preparing raw material particles in which a coating film containing a water-soluble component is formed on the particle surface;

Step (b): giving a defect to the coating film of the raw material particles obtained in step (a); and Step (c): drying particles for supporting a surfactant obtained in step (b).

Preferred embodiments for each of the following steps (a) to (c) will be described below.

Step (a)

A process for drying a slurry includes a process for obtaining dry particles by a known spray-drying, or by dispersing a large number of slurry droplets on a belt made of steel and passing the droplets through a heated tunnel; a process for obtaining particles by introducing a slurry between a pair of drums through which a heated medium is allowed to flow to form a dry thin film, and thereafter finely pulverizing the thin film; and the like. Among them, since there is a large effect in the improvement in the supporting ability when the particles obtained by spray-drying are used, the particles obtained by such a process are preferable.

As the medium for the slurry, water is usually used. The content of each of the components such as the water-soluble component and the water-insoluble inorganic substance in the slurry is not particularly limited, as long as it does not impair the production process. Concretely, the above-mentioned content is preferably from 30 to 65% by weight, more preferably from 45 to 60% by weight, of the slurry.

When the raw material particles are obtained by drying the slurry, the use of the slurry containing the water-soluble component is preferable, because the water-soluble component can be readily formulated with the raw material particles. Usually, the content ratio of each of the components of the slurry is also maintained in the resulting particles. Therefore, as the individual content of each of the components of the slurry, it is preferable that the above-mentioned preferred content is satisfied for the resulting raw material particles.

In addition, when the aqueous medium is added in the subsequent step (b), if the spray-drying is carried out in consideration of the water content to be added in the step (b) such that the water content of the particles can be previously lowered, as compared to that of a specified value of a product detergent, the load on the drying operation can be reduced in the subsequent steps, or the drying operation becomes unnecessary.

Step (b)

The term "defect of a coating film" as referred in the present invention means that a coating film is physically partially damaged to an extent that a surfactant which is added from an external portion of the particle can easily reach an inner portion of the particle, and in an extreme case, an internal structure of the particle is exposed. The forms thereof are partial peeling, cracking, open holes, or the like, depending upon the differences in the extent of damage. Any of these forms can be confirmed by using an electron microscope or the like. As one of the processes for giving a defect to a coating film containing a water-soluble component, wherein the coating film is formed on the raw material particle surface, an operation of applying a mechanical shocking force to the raw material particles is effective. Concretely, a process of treating the raw material particles with a mixer equipped with agitation impellers rotating at a high speed is effective. However, if such a mixer is not employed, there can be employed a process for treating with, for instance, a mixer in which a shearing force is generated between the vessel wall surface of, for instance, a rotary mixer and the raw material particles. By applying an impact force to the raw material particles by using the mixer as described above, a part of the coating film formed on the raw material surface is defected to thereby expose the porous structure on the particle surface.

The continuous process-type mixers which are usable for this process are, for instance, Flexo Mix (manufactured by Powrex Corp.); Spiral Pin Mixer (manufactured by PACIFIC MACHINERY & ENGINEERING Co., LTD.); Flow Jet Mixer (manufactured by Funken Powtechs, Inc.); Turbulizer (manufactured by Hosokawa Micron Corporation); and the like.

The batch process-type mixers are, for instance, Henschel Mixer (manufactured by Mitsui Miike Machinery Co., Ltd.); High-Speed Mixer (Fukae Powtec Corp.); Vertical Granulator (manufactured by Powrex Corp.); Lödige Mixer (manufactured by Matsuzaka Giken Co., Ltd.); PLOUGH SHARE Mixer (manufactured by PACIFIC MACHINERY & ENGINEERING Co., LTD.); Ribbon Mixer (manufactured by Fuji Paudal Co., Ltd.); horizontal, cylindrical mixers; conical rotary mixers; multi-conical rotary mixers, rotary mixers equipped with a slanted leading plate; double rotary mixers; rotary mixers equipped with agitation impellers; and the like.

Another process for giving a defect to a coating film containing a water-soluble component, wherein the coating film is formed on surfaces of the raw material particles, is a process comprising contacting an aqueous medium with raw material particles. Although the process comprising contacting an aqueous medium with raw material particles is not particularly limited, the more uniformly the aqueous medium is contacted with the raw material particles, the greater the effect of the improvement in the supporting ability.

The simplest process for achieving uniform contact is, for instance, a process of directly adding an aqueous medium to particles discharged from a spray-drying tower. The aqueous medium may be sprayed to the particles cascading from the spray-drying tower, or the aqueous medium may be sprayed to the particles transported on a conveyor to a next step from the spray-drying tower.

A still another process is a process of adding an aqueous medium to particles by using a mixer. In this process, the aqueous medium can be more uniformly contacted as compared to the above-mentioned process, and a mechanical impact force can be also simultaneously applied, whereby an effect of improving the supporting ability is made even greater.

As the mixer usable in this process, those of the same types as the mixers for applying a mechanical impact force can be used. Among them, an especially preferable one is Flexo Mix. By spraying the aqueous medium from a spray nozzle arranged near the powder supply inlet and adding the aqueous medium to the particles in a vertical cylinder, uniform mixing can be carried out in an extremely short period of time.

The addition procedures of the aqueous medium to the particles with the above-mentioned mixer may be carried out at any point of the mixer, between an outlet of the spray-drying tower and a mixer for absorbing a surfactant in the particles for supporting a surfactant. Further, a mechanical impact force may be applied to the particles prior to mixing with the surfactant composition using the mixer of step (c) described below.

The particles for supporting a surfactant composition are obtained by step (b) described above.

Incidentally, in step (a), since the evaporation of the moisture mainly takes place at the surface of the slurry, when the slurry containing a water-soluble component is spray-dried, the water-soluble component dissolved in the slurry migrates together with the moisture with the progress of drying. Therefore, the resulting particle finally exhibits a structure such that its surface is coated with a film containing a water-soluble component. When a water-insoluble substance is further contained in the slurry, the resulting particle exhibits a structure such that the water-insoluble substance is present in a larger amount in the inner portion thereof and a coating film containing the water-soluble components is formed in the surroundings thereof. The structure described above of the particle can be analyzed by observing a split cross section and/or surface of the particle with a scanning electron microscope (SEM), or energy dispersion-type spectroscopy (EDS). These phenomena are especially remarkable in sodium carbonate and sodium silicate favorably used as an alkali component, and in the water-soluble polymer having a chelating effect, each of which constitutes the water-soluble components.

When the particle surface is coated by a film described above, the actual supporting ability of the particles is undesirably lowered. This is because the micropores which are supposed to absorb liquids existing on the surface are almost covered, even if there exist a substance having a supporting space such as micropores or supporting ability in the inner portion of the particle, so that the particles latently have high supporting ability. Therefore, in order to improve the supporting ability of the particles, the substance having a supporting space in the inner portion thereof and/or the substance having a supporting ability must be effectively utilized. In view of this, in the present invention, by making the surface porous by giving a defect to the above-mentioned coating film in step (b), the improvement in the supporting ability of the particles is achieved. Therefore, when the spray-dried particles obtainable by spray-drying a slurry containing a water-soluble component, which have been conventionally considered to be unsuited for the particles for supporting a surfactant, are used as the raw material particles, the present invention can be especially preferably applied.

As described above, the present invention is aimed to solve the problem inherently owned by the particle in which a coating film containing a water-soluble component is formed on the surface thereof, and has a clearly a different technical idea from the technique disclosed in Japanese Patent Laid-Open No. Sho 63-275699 which is aimed to improve the productivity, with maintaining the bulk density of currently used detergent within a set range.

Step (c)

The particles for supporting a surfactant obtained in step (b) may be dried as occasion demands. Although the drying process for the particles for supporting a surfactant is not particularly limited, known processes utilizing devices such as fluidized bed dryers, air current dryers, aerated rotary dryers, and vibrating and transporting dryers are employed. In addition, when air to transportation is employed when the particles for supporting a surfactant obtained in step (b) are transported to a device in step (d), the particles can be dried at the same time as the transportation. When a dry hot air is used as a transported air, the drying effect is further enhanced.

6. Composition and Properties of Particles for Supporting Surfactant

The composition for each component of the particles for supporting a surfactant is not limited. In the process of the present invention, the composition of the raw material particles is usually maintained in the resulting composition.

The preferred average particle size of the particles for supporting a surfactant is from 150 to 500 μm, more preferably from 180 to 300 μm. Within this range, it is preferable from the viewpoint of obtaining detergent particles having excellent dissolubility.

The preferred bulk density of the particles for supporting a surfactant is from 400 to 1000 g/L, more preferably from 500 to 800 g/L. Within this range, it is preferable from the viewpoint of obtaining detergent particles having a bulk density of 500 g/L or more.

The preferred particle strength of the particles for supporting a surfactant is from 5 to 200 MPa, more preferably from 10 to 150 MPa, especially preferably from 15 to 100 MPa. Within this range, it is preferable from the viewpoints that the particles for supporting a surfactant are not disintegrated when a liquid surfactant is added to the particles for supporting a surfactant, and that the detergent particles have excellent disintegration properties when dissolved in water.

The preferred supporting ability of the particles for supporting a surfactant is 20 cc/g or more, more preferably 40 cc/g or more. Within this range, it is preferable from the viewpoint of improvement in the compositional freedom of the detergent particles obtained by adding a surfactant to the particles for supporting a surfactant.

It is preferable that the particles for supporting a surfactant are dried to give a water content specified below.

The water content of the particles for supporting a surfactant is preferably from 1 to 8% by weight, more preferably from 1 to 5% by weight, especially preferably from 1 to 4% by weight. Within this range, particles for supporting a surfactant having high supporting ability and excellent handleability are obtained.

7. Composition and Properties of Detergent Particles

The detergent particles obtained by the process of the present invention comprise the particles for supporting a surfactant obtained by the process of the present invention and a surfactant supported therein. The surfactant includes, for instance, a surfactant which is in a liquid state during the operation of mixing the above-mentioned particles for supports and the surfactant. Therefore, in addition to a surfactant which is a liquid at the temperature for the mixing operation, a surfactant which is a solid at that temperature can be used, as long as the solid surfactant is in the form of a solution or a suspension by dissolving or dispersing the surfactant into a proper medium.

The liquid surfactants to be supported are preferably an anionic surfactant and a nonionic surfactant.

En% Among them, a surfactant composition comprising (D) a nonionic surfactant having a melting point of 30° C. or lower, (E) an anionic surfactant having a sulfate group or a sulfonate group, and (F) an immobilization agent of the component (D) is suitable as a surfactant for supports. In this case, the amount of the component (E) formulated is preferably from 0 to 300 parts by weight, more preferably from 20 to 200 parts by weight, especially preferably from 30 to 180 parts by weight, based on 100 parts by weight of the component (D). The amount of the component (F) formulated is preferably from 1 to 100 parts by weight, more preferably from 5 to 50 parts by weight, based on 100 parts by weight of the component (D).

The component (D) is those having a melting point of preferably 30° C. or lower, more preferably 25° C. or lower, especially preferably 22° C. or lower. As preferred ones, there are exemplified, for instance, a polyoxyalkylene alkyl (phenyl) ether, an alkyl(polyalkylene) polyglycoside, and a polyoxyalkylene sorbitan fatty ester.

Especially, a polyoxyalkylene alkyl ether obtained by adding 4 to 12 moles, preferably 6 to 10 moles, of an alkylene oxide to an alcohol having 10 to 14 carbon atoms is preferable. Here, the alkylene oxide includes ethylene oxide and propylene oxide, and ethylene oxide is preferable. The nonionic surfactant may be used in combination of two or more kinds. The nonionic surfactant may be used in the form of an aqueous solution.

The component (E) includes a salt of a sulfuric ester of an alcohol having 10 to 18 carbon atoms, a salt of a sulfuric ester of an ethoxylated compound of an alcohol having 10 to 18 carbon atoms, an alkylbenzenesulfonate of which alkyl moiety has 10 to 18 carbon atoms, and the like. Among them, a linear alkylbenzenesulfonate of which alkyl moiety has 12 to 14 carbon atoms is preferable, and especially preferable are alkali metal salts such as sodium salts and potassium salts, and amine salts such as monoethanolamine and diethanolamine.

The component (F) includes an anionic surfactant having a carboxylate group or a phosphate group, excluding those having a sulfate group or a sulfonate group, and concretely an anionic surfactant such as a salt of a fatty acid, a salt of a hydroxyfatty acid, an alkyl phosphate, and the like. Especially preferable are one or more kinds selected from sodium salts and potassium salts of a saturated fatty acid having 14 to 20 carbon atoms, from the viewpoints of the suppression of bleed-out and strength of the detergent particles.

The component (F) also includes a compound having a melting point of 35° C. or higher which is miscible with the component (D), for instance, one or more kinds selected from polyoxyalkylene-type nonionic compounds having a molecular weight of from 3000 to 30000; polyether-based nonionic compounds having a molecular weight of from 3000 to 30000; and the like. Especially, polyethylene glycol, polypropylene glycol and polyoxyethylene alkyl ether are preferable.

The amount of the surfactant added is preferably in the range of from 10 to 100 parts by weight, more preferably in the range of from 20 to 80 parts by weight, especially preferably in the range of from 30 to 60 parts by weight, based on 100 parts by weight of the particles for supporting a surfactant, from the viewpoint of exhibiting the detergency and the viewpoint of preventing the bleed-out Since the particles for supporting a surfactant obtained according to the present invention are excellent in the supporting ability, a larger amount of the surfactant than that in a conventional detergent can be supported as described above without causing bleed-out.

When the surfactant and the particles for supporting a surfactant are mixed, a powdery raw material other than the particles for supporting a surfactant may be added as occasion demands. The amount of the powdery raw material added is preferably from 0 to 150 parts by weight based on 100 parts by weight of the particles for supporting a surfactant. The powdery raw material includes, for instance, aluminosilicates, crystalline silicates, and the like.

The preferable properties of the detergent particles according to the present invention are as follows.

The average particle size is preferably from 150 to 500 $\mu$m, more preferably from 180 to 400 $\mu$m. In addition, the average particle size of the detergent particles is preferably equal to or less than 1.5 times, more preferably equal to or less than 1.3 times, the average particle size of the particles for supporting a surfactant, from the viewpoint of the dissolubility. It is especially preferable that the detergent particles have an average particle size of the above ranges, and that the detergent particles comprise a uni-core detergent particle in which one detergent particle is substantially constituted by one particle for supporting a surfactant.

The bulk density is preferably from 500 to 1000 g/L, more preferably from 600 to 1000 g/L, especially preferably from 650 to 850 g/L.

The anti-caking property evaluated as sieve permeability is preferably 90% or more, more preferably 95% or more.

The bleed-out property evaluated by the test method described below is preferably 2 rank or better, more preferably 1 rank. When the bleed-out property is ranked as above, it is preferable because contrivances are not necessary for prevention of deposition of a liquid surfactant-containing powder to equipments during transportation, or for prevention for bleed-out to vessels.

The flowability evaluated as flow time is preferably 7 seconds or shorter, more preferably 6 seconds or shorter.

8. Process for Preparing Detergent Particles

A preferable process for obtaining detergent particles comprises the following step (d), and the process may further comprise step (e) as occasion demands.

Step (d): mixing a surfactant composition with the particles for supporting a surfactant obtained by the process of the present invention, under the conditions that the surfactant composition is in a liquid state.

Step (e): mixing the mixture obtained in step (d) with a fine powder, thereby coating the surface of the powdery detergent composition with the fine powder, provided that there is also included a case where step (e) proceeds simultaneously with the disintegration.

The mixer used in step (d) is preferably one equipped with, for instance, a nozzle for adding a surfactant composition, and a jacket for controlling the temperature inside the mixer. Concretely, a mixer usable in step (b) is preferable. From the viewpoints of being capable of carrying out step (e) described below in the same mixer, thereby simplifying the equipment, preferred mixers are a mixer containing an agitating shaft arranged along the center line of a horizontal, cylindrical blending vessel and agitating impellers arranged on the agitating shaft, to carry out blending of powder, including Lödige Mixer (manufactured by Matsuzaka Giken Co., Ltd.), PLOUGH SHARE Mixer (manufactured by PACIFIC MACHINERY & ENGINEERING CO., LTD.), and the like. In addition, from the viewpoint of being capable of suppressing the disintegration of the particles for supporting a surfactant, preferred mixers also include a conical screw mixer, for instance, Nauta Mixer (manufactured by Hosokawa Micron Corp.); a ribbon mixer, for instance, Ribbon Mixer (manufactured by Nichiwa Kikai Kogyo K.K.); and the like.

The preferable mixing time (in the case of a batch process) and the preferable average residence time (in the case of a continuous process) are preferably from 1 to 20 minutes, especially preferably from 2 to 10 minutes.

In order that the surfactant is to be in a liquid state, the temperature inside the mixer in this step is, preferably a temperature equal to or higher than the pour point of the surfactant used, preferably a temperature higher than the pour point by 10° C. or more, especially preferably a temperature higher than the pour point by 20° C. or more. The pour points of the surfactant and the surfactant composition refer to the values measured by the method according to JIS K 2269.

By further carrying out step (e), the flowability and the anti-caking property of the detergent particles can be improved. In the case where the mixture obtained in step (d) is not in a powdery state, step (e) also comprises a step of disintegrating the mixture using a fine powder as an aid. The fine powder is preferably one having an average primary particle size of 10 μm or less from the viewpoints of improvement in the coating ratio of the surface of the detergent particle, and improvements in the flowability and the anti-caking property of the detergent particles.

The fine powder is preferably an aluminosilicate. Also, inorganic fine powder including calcium silicate, silicon dioxide, bentonite, talc, clay, amorphous silica derivatives, and silicate compounds such as crystalline silicate compounds, and metal soaps of which primary particle has a size of 10 μm or less can be used.

The amount of the fine powder used is preferably from 0.5 to 40 parts by weight, more preferably from 1 to 30 parts by weight, especially preferably from 2 to 20 parts by weight, based on 100 parts by weight of the detergent particles, from the viewpoints of the flowability and the users' feel.

The mixer usable in step (e) is preferably, for instance, one comprising disintegration impellers with a high-speed rotation inside the mixer from the viewpoints of improvement in the dispersibility of the fine powder added, and improvement in the disintegration efficiency. The mixer can be the same ones as those in step (d).

9. Method for Measuring Properties of Raw Material Particles, Particles for Supporting Surfactant and Detergent Particles The values of the properties in the present specification are measured by the following methods.

(1) Average particle size: Measured by vibrating a sample with each of standard sieves according to JIS Z 8801 for 5 minutes, and thereafter determining the average particle size from a weight distribution depending upon the size of openings of each sieve.

(2) Bulk density: Measured by the method according to JIS K 3362.

(3) Supporting ability: A cylindrical round bottom vessel of an inner diameter of 5 cm and a height of 15 cm which comprises agitation impellers in the inner portion thereof is charged with 100 g of a sample. With stirring the contents, linseed oil is supplied at a rate of 10 cc/min. The amount of linseed oil supplied when the agitation torque of the agitator reaches the highest level is defined as the supporting ability.

(4) Particle strength: A cylindrical vessel of an inner diameter of 3 cm and a height of 8 cm is charged with 20 g of a sample, and the sample-containing vessel (manufactured by Tsutsui Rikagaku Kikai K.K., "Model TVP1" tapping-type close-packed bulk density measurement device; tapping conditions: period 36 times/minute, free fall from a height of 60 mm) is tapped for 30 times. The sample height (an initial sample height) at that time is measured. Thereafter, an entire upper surface of the sample kept in the vessel is pressed at a rate of 10 mm/min with a pressing machine to take measurements for a load-displacement curve. The slope of the linear portion at a displacement rate of 5% or less is multiplied by an initial sample height, and the resulting product is divided by a pressed area, to give a quotient which is defined as particle strength.

(5) Water content: A 3 g sample is placed on a weighing dish, and dried in an electrical drier kept at 105° C. for 2 hours. The difference in weight of the sample before and after drying is defined as water content.

(6) Anti-caking property: An open-top carton having dimensions of 10.2 cm in length, 6.2 cm in width, and 4 cm in height is made out of a filter paper (No. 2, manufactured by ADVANTEC). The four corners are stapled. An acrylic resin plate (15 g) and a lead plate (250 g) are placed on the carton containing 50 g of the sample. The above carton is allowed to stand in an atmosphere at a temperature of 35° C. and at a humidity of 40% for 1 month, and the following permeability described below was obtained for the caking conditions to evaluate the anti-caking property.

<Permeability> A sample obtained after the test is gently placed on a sieve (sieve opening: 4760 μm, as defined by JIS Z 8801), and the weight of the powder passing through the sieve is measured. The permeability (%) based on the sample after the test is determined.

(7) Bleed-out property: Bleed-out state is visually evaluated at bottom portion (side not contacting with powder) of the vessel made of the filter paper after the anti-caking test. The evaluation is made based on the area of wetted portion occupying the bottom in the following 1 to 5 ranks.

Rank 1: not wetted
  2: about ¼ of the area being wetted
  3: about ½ of the area being wetted 4: about ¾ of the area being wetted 5: the entire area being wetted (8) Flowability: The flow time refers to a time period required for flowing 100 mL of powder from a hopper used in a measurement of bulk density as defined in JIS K 3362.

EXAMPLES

Preparation of Particles

Raw material particles (Particles 1) were prepared by the procedures described below.

Four-hundred and twenty kilograms of water was supplied into 1m³-mixing vessel, and the temperature was raised to 40° C. One-hundred and twenty kilograms of sodium carbonate, 84 kg of sodium sulfate, 9 kg of sodium sulfite, 135 kg of a 40% by weight-aqueous sodium polyacrylate solution, 3 kg of a fluorescent dye, and 300 kg of Zeolite 4A-Type were sequentially added thereto, and the resulting mixture was agitated for 30 minutes, to give a homogeneous slurry. The final temperature of this slurry was adjusted to 60° C.

The slurry was supplied to a spray-drying tower (countercurrent type) with a pump, and sprayed with a pressure spray nozzle arranged near the top of the tower at a spraying pressure of 2.5 MPa A high-temperature gas fed to the spray-drying tower was supplied from the bottom portion of the tower at a temperature of 230° C. and exhausted from the top of the tower at 110° C. The water content in the resulting Particles 1 was 5% by weight. The split cross section and the surface of a particle of Particles 1 were observed by SEM. As a result it was confirmed that a coating film was formed on the particle surface (FIG. 1(a) and (b)), and that the coating film contained a water-soluble component by EDS determination.

Particles for supporting a surfactant were prepared using Particles 1. The composition of the particles and the conditions for preparation in each Example are shown in Table 1.

TABLE 1

| Composition of Particles (% by weight) | Particles 1 | Ex. 1 | Ex. 2 | Ex. 3 | Ex. 4 | Ex. 5 |
|---|---|---|---|---|---|---|
| Zeolite | 50 | 50 | 49.8 | 50 | 50 | 50 |
| Sodium Carbonate | 20 | 20 | 19.9 | 20 | 20 | 20 |
| Sodium Sulfate | 14 | 14 | 13.9 | 14 | 14 | 14 |
| Sodium Sulfite | 1.5 | 1.5 | 1.5 | 1.5 | 1.5 | 1.5 |
| Sodium Polyacrylate | 9 | 9 | 8.9 | 9 | 9 | 9 |
| Fluorescent Dye | 0.5 | 0.5 | 0.5 | 0.5 | 0.5 | 0.5 |
| Water | 5 | 5 | 5.5 | 5 | 5 | 5 |
| Type of Mixer | — | Flexo Mix | Flexo Mix | Flexo Mix | Flexo Mix | PLOUGH SHARE |
| Aqueous Medium Added | — | None | Water | Water | Steam | Water |
| Amount of Aqueous Medium Added | — | — | 1 | 3 | 1 | 3 |
| Drying Process | — | No | No | Yes | No | Yes |

*: The amount of water added based on 100 parts by weight of the particles (parts by weight)

Example 1

Particles 1 were continuously supplied into Flexo Mix (manufactured by Powrex Corp.; Type: 160) at a rate of 300 kg/hr, to give Particles 1 for Supporting Surfactant. The rotational speed of the agitation impellers of Flexo Mix in this case was set to 3000 rpm, and an aqueous medium was not added.

Example 2

Figure 2:
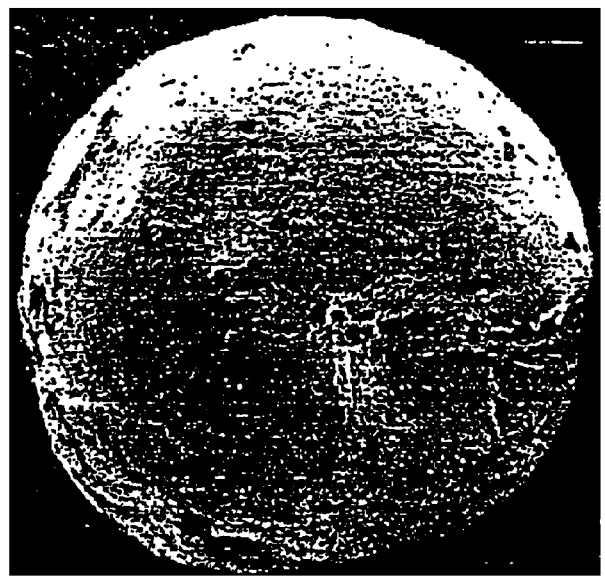
FIG. 2 is an SEM view showing the surface of the particles after an aqueous medium is brought into contact with the raw material particles.

Particles 1 were continuously supplied into Flexo Mix (manufactured by Powrex Corp.; Type: 160) at a rate of 300 kg/hr. Water was sprayed at a rate of 3 kg/hr with a spray nozzle arranged inside a mixing cylinder of Flexo Mix, and the contents were continuously mixed, to give Particles 2 for Supporting Surfactant. The rotational speed of the agitation impellers of Flexo Mix in this case was set to 3000 rpm. The surface of Particles 2 for Supporting Surfactant was observed by SEM. As a result, it was found that a coating film containing a water-soluble component was partially melted away from the particle surface, so that micropores were exposed (FIG. 2).

Example 3

Particles 1 were continuously supplied into Flexo Mix at a rate of 300 kg/hr. Water was sprayed at a rate of 9 kg/hr with a spray nozzle arranged inside the mixing cylinder. Ten kilograms of the resulting particles were charged into a fluidized bed drier, and dried with a hot air at 100° C. for 30 minutes, thereby giving Particles 3 for Supporting Surfactant having a water content of 5% by weight.

Example 4

In Example 2, steam at 120° C. was sprayed in place of water, to give Particles 4 for Supporting Surfactant.

Example 5

Thirty kilograms of Particles 1 were supplied into PLOUGH SHARE Mixer (manufactured by PACIFIC MACHINERY & ENGINEERING Co., LTD.; capacity: 150 L), and a main shaft was rotated at 120 rpm. Thereto was sprayed 0.3 kg of water in 2 minutes with a spray nozzle. Ten kilograms of particles out of the resulting Particles was introduced into a fluidized bed drier, and dried with a hot air at 100° C. for 30 minutes, thereby giving Particles 5 for Supporting Surfactant having a water content of 5% by weight The properties of Particles 1 and each group of Particles 1 to 5 for Supporting Surfactant are shown in Table 2. An effect of improving the supporting ability according to the present invention is obvious.

TABLE 2

| Properties | Particles 1 | Particles 1 for Supports* | Particles 2 for Supports* | Particles 3 for Supports* | Particles 4 for Supports* | Particles 5 for Supports* |
|---|---|---|---|---|---|---|
| Average Particle Size ($\mu$m) | 260 | 260 | 260 | 270 | 260 | 280 |
| Bulk Density (g/L) | 632 | 635 | 637 | 612 | 620 | 635 |
| Supporting Ability (cc/g) | 0.20 | 0.25 | 0.30 | 0.37 | 0.40 | 0.36 |
| Particle Strength (Mpa) | 25 | 25 | 25 | 23 | 27 | 30 |

*: Particles for Supporting Surfactant is abbreviated as "Particles for Supports."

Detergent Particles were prepared using Particles 1 and each group of Particles 1 to 5 for Supporting Surfactant obtained as above.

Example 6

A surfactant composition (polyoxyethylene alkyl ether/ polyethylene glycol/LAS-Na/water=42/8/42/8 (weight ratio)) was heated to 80° C. At this temperature, the above surfactant composition was in a liquid state. Next, 100 parts by weight (20 kg) of Particles 1 for Supporting Surfactant were supplied into a Lödige Mixer (manufactured by Matsuzaka Giken C6., Ltd.; capacity: 130 L; equipped with a jacket), and the agitation of a main shaft (rotational speed of agitation impellers: 60 rpm; peripheral speed: 1.6 m/s) was started. Incidentally, hot water at 80° C. was allowed to flow through the jacket at 10 L/minute. Thirty parts by weight (6 kg) of the above-mentioned surfactant composition were supplied into the above mixer in 2 minutes, and thereafter the resulting mixture was agitated for 5 minutes. Further, in order to give excellent flowability as detergent particles, an amorphous aluminosilicate was supplied thereinto. The agitations of the main shaft (rotational speed of agitation impellers: 120 rpm; peripheral speed: 3.1 m/s) and a chopper (rotational speed: 3600 rpm; peripheral speed: 28 m/s) were carried out for 1 minute, and Detergent Particles 1 were discharged.

Examples 7 to 10

Each group of Detergent Particles 2 to 5 were prepared in a similar manner using each group of Particles 2 to 5 for Supporting Surfactant in place of Particles 1 for Supporting Surfactant in Example 6.

Comparative Example 1

Detergent Particles were prepared in a similar manner using Particles 1 in place of Particles 1 for Supporting Surfactant in Example 6.

The properties of the resulting Detergent Particles and the amount of the amorphous aluminosilicate (oil-absorbing carrier) used in order to prepare Detergent Particles are shown in Table 3. The amount of oil-absorbing carrier could be reduced by improving the supporting ability of the raw material particles.

TABLE 3

| Particle Used | Example 6 Particles 1 for Supports* | Example 7 Particles 2 for Supports* | Example 8 Particles 3 for Supports* | Example 9 Particles 4 for Supports* | Example 10 Particles 5 for Supports* | Comparative Example 1 Particles 1 |
|---|---|---|---|---|---|---|
| Composition (parts by weight) | | | | | | |
| Particles for Supports* or Raw Material Particles | 100 | 100 | 100 | 100 | 100 | 100 |
| Surfactant Composition | 30 | 30 | 30 | 30 | 30 | 30 |
| Amorphous Aluminosilicate | 12 | 10 | 8 | 7 | 8 | 15 |
| Properties | | | | | | |
| Average Particle Size ($\mu$m) | 306 | 315 | 303 | 295 | 305 | 330 |
| Bulk Density (g/L) | 726 | 715 | 734 | 740 | 727 | 690 |
| Flowability (second) | 6.3 | 6.4 | 6.3 | 6.4 | 6.3 | 6.4 |
| Bleed-out Properties After One-Month Storage | 1 | 1 | 1 | 1 | 1 | 1 |

*: Particles for Supporting Surfactant is abbreviated as "Particles for Supports."

Here, as a polyoxyethylene alkyl ether, there was used one manufactured by Kao Corporation under the trade name of EMULGEN 108 KM (average moles of ethylene oxides: 8.5; number of carbon atoms in alkyl moiety: 12 to 14). As a polyethylene glycol, there was used one manufactured by Kao Corporation under the trade name of K-PEG 6000 (average molecular weight: 8500). As an amorphous aluminosilicate, there was used one prepared by pulverizing the amorphous aluminosilicate described in Preparation Example 2 of Japanese Patent Laid-Open No. Hei 9-132794 to an average particle size of 8 $\mu$m.

Industrial Applicability

This is a process for preparing particles for supporting a surfactant for preparing detergent particles by adding a liquid surfactant, in which the supporting ability of the particles can be improved, without using the raw materials which affect the performance of the detergent composition. Further, in the process for preparing detergent particles, the surfactant can be formulated in a large amount without impairing powder properties such as flowability of the detergent particles.

The present invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A process for preparing particles for supporting a surfactant, comprising a step of giving a defect to a coating film containing a water-soluble component, wherein the coating film is formed on surfaces of raw material particles comprising a water-soluble polymer, a water-soluble salt, a water-insoluble inorganic substance, and substantially contain no surfactant, and the raw material particles are brought in contact with an aqueous medium in the step of giving a defect to the coating film prior to supporting the surfactant.

2. The process according, to claim 1, wherein the raw material particles comprise dry particles obtained by spray-drying a slurry containing the water-soluble component.

3. The process according to claim 1, wherein the amount of the aqueous medium to be brought in contact is from 0.1 to 10 parts by weight as water, based on 100 parts by weight of the raw material particles.

4. The process according to claim 1, wherein said water-soluble polymer is selected from the group consisting of a carboxylic acid-based polymer, a carboxymethyl cellulose, a soluble starch and a sugar.

5. The process according to claim 1, wherein said water-insoluble inorganic substance has an average primary particle size of from 0.1 to 20 $\mu$m.

6. The process according to claim 1, wherein the content of the water-soluble polymer is from 2 to 30% by weight of the raw material particles.

7. The process according to claim 1, wherein the content of the water-soluble salt is from 5 to 78% by weight of the raw material particles.

8. The process according to claim 1, wherein the content of the water-insoluble inorganic substance is from 20 to 90% by weight of the raw material particles.

9. The process according to claim 1, wherein said aqueous medium is steam.

10. The process according to claim 1, wherein the average particle size of said raw material particles is from 150 to 500 $\mu$m.

11. A process for preparing detergent particles comprising a step of mixing a surfactant composition and the particles for supporting a surfactant obtained by the process according to claim 1, under conditions that the surfactant composition shows a liquid state.

* * * * *